United States Patent [19]

Gluzerman et al.

[11] Patent Number: 4,887,894

[45] Date of Patent: Dec. 19, 1989

[54] BEAM DEFLECTOR

[75] Inventors: Boris Gluzerman, Chicago; Nicholas Lakatos, Des Plaines; Paul W. Hensler, Lake Bluff, all of Ill.

[73] Assignee: Edward Weck Incorporated, Princeton, N.J.

[21] Appl. No.: 306,721

[22] Filed: Feb. 6, 1989

[51] Int. Cl.[4] .............................................. G02B 5/08
[52] U.S. Cl. .................................... 350/636; 350/635; 350/632
[58] Field of Search ............... 350/632, 634, 635, 636, 350/640; 248/476, 482; 74/471 XY; 128/303.1

[56]  References Cited

U.S. PATENT DOCUMENTS

| | | |
|---|---|---|
| 3,865,113 | 2/1975 | Sharon et al. . |
| 3,865,114 | 2/1975 | Sharon . |
| 4,015,906 | 4/1977 | Sharon . |
| 4,123,143 | 10/1978 | Yachin et al. . |
| 4,228,341 | 10/1980 | Zandberg . |
| 4,597,380 | 7/1986 | Raif et al. . |
| 4,721,274 | 1/1988 | Erb . |
| 4,798,452 | 1/1989 | Erb ...................................... 350/632 |

Primary Examiner—Bruce Y. Arnold
Assistant Examiner—J. Patrick Ryan
Attorney, Agent, or Firm—Donald J. Barrack; Robert E. Lee, Jr.

[57]  ABSTRACT

An improved beam deflector having a first ball element attached to a second ball element with the first ball element mounted in a movable socket, movable about a single axis only through the first ball element. The second ball element is mounted in a fixed socket and is rotatable about a single axis only through the second ball element. The fixed socket is fixed to the housing of the beam deflector. Rotational movement is limited by the spacing between opposing flat surfaces of the movable and fixed sockets. The movable socket is remotely movable in response to movement of a control rod which is coupled to the movable socket through a universally movable third ball and socket arrangement.

7 Claims, 3 Drawing Sheets

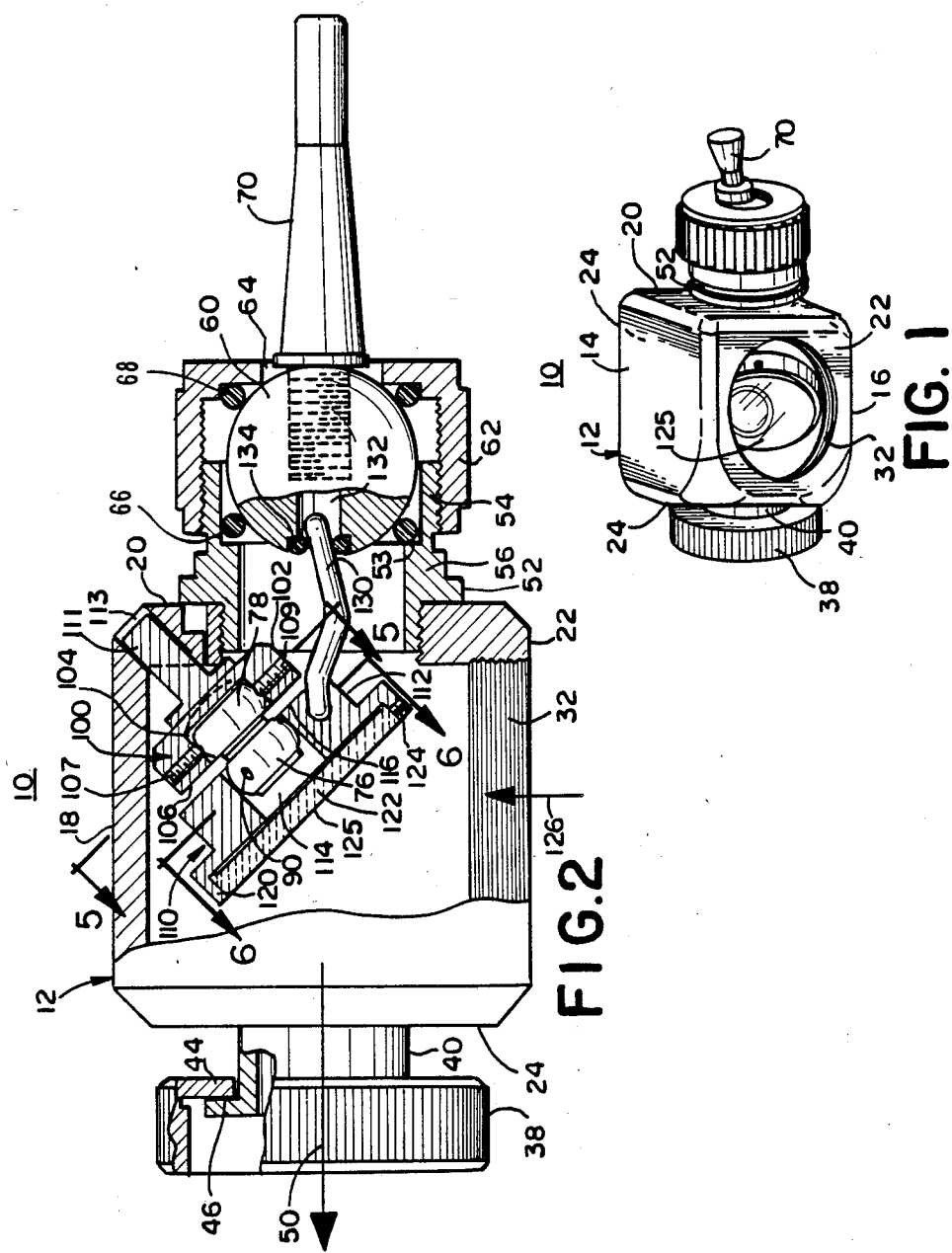

BEAM DEFLECTOR

BACKGROUND OF THE INVENTION

The present invention is directed to a beam deflector for deflecting a beam of emitted energy in response to the movement of a universally movable control rod. More particularly the system can be used for controlling a laser beam used in surgical procedures.

Laser beams are being used more and more in surgical procedures. When using laser beams with endoscopes, for example, it is necessary to provide a device which will on the one hand couple the laser beam to the endoscope and at the same time provide control over the laser beam so that the beam can be accurately directed through an operating channel of an endoscope or operative cannula to the operating site spaced away from the distal end of the endoscope. Various types of mechanical systems are now in use but improvements are always being sought with respect to the ease and precision by which such systems may be conveniently manipulated by the surgeon during the performance of a delicate surgical procedure.

SUMMARY OF THE INVENTION

An object of the present invention is to provide a beam deflector for deflecting a beam in response to the movement of a universally movable control member with improved precision and ease and convenience of use.

A beam deflector is provided which deflects a beam of emitted energy from a first path to one of a plurality of second paths. The beam deflector includes a first ball element mounted in a first socket which is rotational about a first axis only through the first ball element. A second ball element is mounted in a second socket for rotational movement about a second axis only. The first and second ball elements are rigidly attached to one another. The first and second ball elements and sockets together form a means for deflecting the beam. A control means is provided which is coupled to the deflecting means for remotely moving the deflecting means to select a second path for the deflected beam.

BRIEF DESCRIPTION OF THE DRAWINGS

FIG. 1 is a perspective view of the preferred embodiment beam deflector.

FIG. 2 is a top planar view of the beam deflector of FIG. 1 shown partially in cross section.

DETAILED DESCRIPTION OF THE DRAWINGS

Figure 3:
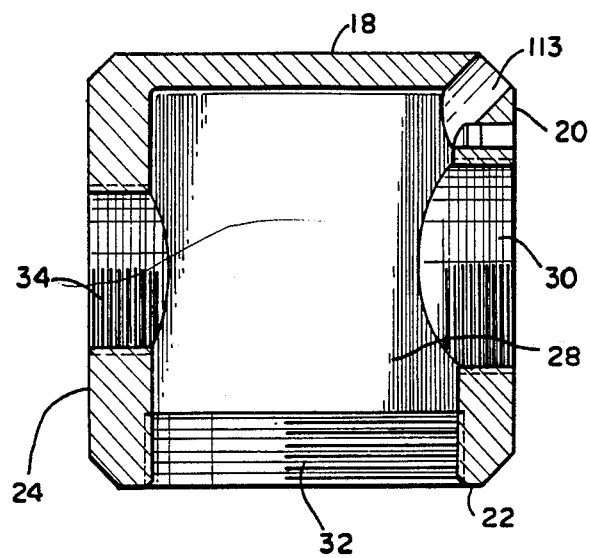
FIG. 3 is a cross section of a housing portion of the beam deflector of FIG. 1.

Referring now to FIGS. 1 and 2, the beam deflector designated generally 10 is shown. It comprises a generally cubical housing 12 having top and bottom sides 14 and 16 and remaining sides even numbers 18 through 24. The interior of the housing defines a chamber 28. Sides 20, 22 and 24 include circular threaded openings 30, 32 and 34, respectively.

A circular connection ring 38 with an opening therethrough threaded at one end is captured by a hollow, cylindrical retainer 40 which is passed through the opening in the ring 38 and threaded into the opening 34 in side 24. The interior ledge formed by annular interior flange 44 on the connector ring is captured between the flange 46 on the end of retainer 40 and the sides 24 of the housing 12. The chamber 28 is in fluid communication with ambient atmosphere through the hollow retainer 40 and the opening in ring 38 following a pathway generally along line and arrow 50 in FIG. 2.

A generally cylindrical hollow body 52 is threaded into opening 30 in side 20 opposite side 24. An annular interior ledge 53 is formed within the body 5 where a thin wall portion 54 of the body meets a thicker wall portion 56. The body 52 is adapted to receive a ball 60 with the diameter of the thin wall portion 54 being just slightly larger than the ball 60.

A hollow cylindrically shaped cap 62 has a threaded open end and a partially closed end with an opening 64. The threaded open end mates with external threads on the thin wall portion 54 to capture the ball 60 between the body 52 and cap 62. Teflon ™ O-rings 66 and 68 are positioned between the ball 60 and the interior annular ledge and between the ball 60 and the closed end of the cap 62 to provide low friction surfaces to allow the ball to rotate universally within the socket formed by the body 52 and cap 62 assembly. By "universally" is meant that the ball can be rotated in any angular direction desired. A control rod 70 extends through the opening 64 in the cap to be attached to the ball 60. A threaded end of the rod screws into a threaded hole in the ball.

Figure 4:
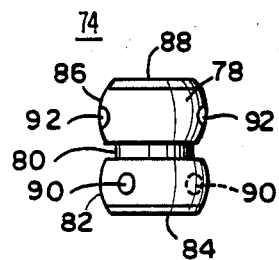
FIG. 4 is a front elevational view of a portion of the beam deflector of FIGS. 1 and 2.
Figure 5:
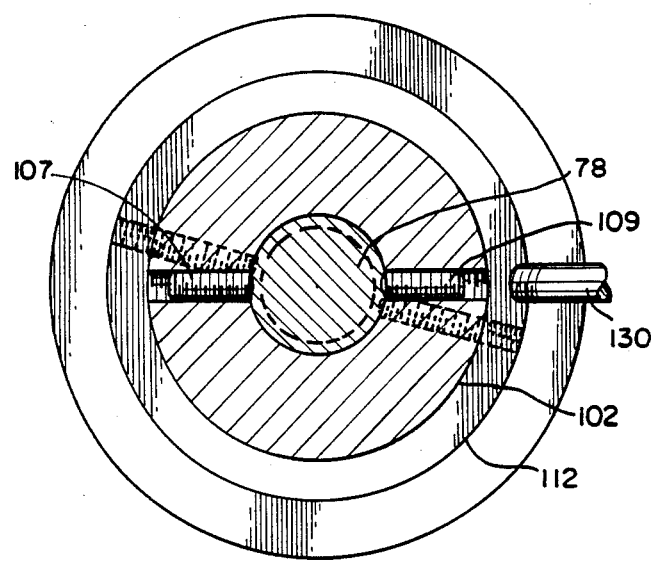
FIG. 5 is a cross section of a portion of the beam deflector of FIG. 2 taken along the lines and arrows 5—5 in FIG. 2.
Figure 6:
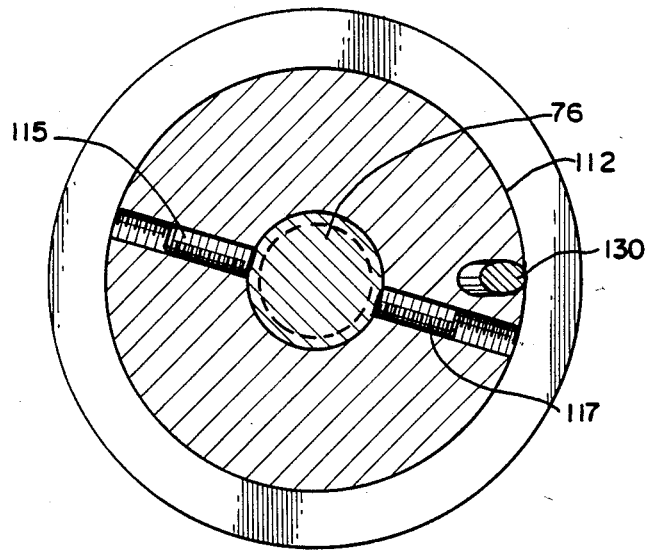
FIG. 6 is a cross section of a portion of the beam deflector of FIG. 2 taken along the lines and arrows 6—6 in FIG. 2.

Referring now to FIGS. 4 through 6, the beam deflector 10 includes a deflector means which includes a ball assembly designated generally 74 comprising first and second ball elements 76 and 78 rigidly coupled together by a short cylinder portion 80. An annular spherical surface 82 is truncated on one end by a flat circular side 84 and on the other by the cylinder portion 80. Similarly second ball element 78 has an annular spherical surface 86 truncated at one end by a flat circular surface 88 and on its other end by the cylinder portion 80. Annular spherical surfaces 82 and 86 and cylinder portion 80 are coaxial with the axis passing through the center of surfaces 84 and 88 which are parallel. In the preferred embodiment the radius of curvature of the spherical surfaces are the same, preferably, 0.125 inch radius while the maximum diameter of each of the ball elements 76 and 78 is 0.250 inches.

First ball element 76 has a pair of diametrically opposed indentations 90 on the equatorial line of the spherical surfaces 82. Second ball element 78 also has a pair of diametrically opposed indentations 92. The plane containing the indentations 90 and the axis of the assembly 74 is angularly spaced apart from the plane containing the indentations 92 and the axis of the assembly 74. The angle is less than 90° and in the preferred embodiment is approximately 15°. This is shown more clearly in FIGS. 5 and 6.

Referring now to FIG. 2, the second ball element 78 is mounted within a stationary socket 100 which has a cylindrical body 102 with a bore 104 through a flat side 106. The bore does not pass all the way through the body and has a diameter just large enough to rotationally receive the ball element 78 at the spherical annular surface 86. Two set screws 107 and 109 are threaded through diametrically opposed threaded bores in the cylindrical body 102 to engage the indentations 92. Hence, the second ball element 78 is only free to rotate within the socket 100 about the axis through the indentations 92. The socket is rigidly attached to the housing 12 by a rod 111 attached to the body 102 and inserted into a hole 113 in the corner of the housing formed by sides 18 and 20 midway between sides 14 and 16.

A movable socket 110 is mounted for rotation about the spherical surface 82 of the first ball element 76. It comprises a first cylindrical body 112 with a bore 114 through a flat side 116. The diameter of the bore is just large enough to rotationally receive the spherical surface 82 of ball element 76. Set screws 115 and 117 are screwed through diametrically threaded bores in cylindrical body 112 to engage the indentations 90 in first ball element 76 so that the socket 110 is free to rotate about the axis through the indentations 90. Flat surfaces 106 and 116 are spaced apart from one another by a preselected distance when the sides are parallel. First ball element 78 can only rotate about its axis of rotation through indentations 92 by a limited range of rotation because side 116 will engage side 106. Similarly, when rotating socket 110 about the axis through indentations 90, its rotation is limited when side 116 engages side 106.

The socket 110 is coupled to the ball 60 by a connecting rod 130 which has a double bend. The end of rod 130, which is coupled to ball 60, is inserted into a bore 132 on ball 60 through an O-ring 134 in the opening of the bore 132. When control rod 70 is moved the ball 60 rotates in its socket and through connecting rod 130 causes the socket 110 to rotate as well.

Socket 110 further comprises an annular wall 120 which is formed integrally with cylindrical body 112 and is located opposite side 116. The annular wall 120 defines a cylindrical recess which accommodates a circular mirror 122 held in place by set screw 124. When mounted within the recess created by annular wall 120, the reflecting surface 125 of the mirror is substantially parallel to flat side 106 of socket 100. The double bend on rod 130 is used to center the control rod 70 when the mirror 122 is positioned at 45° to the axes of both the opening 32 and the opening through ring 38.

Rod 111 extends into chamber 28 at angle of 45° relative to the right angle corner made by the juncture of sides 18 and 20 and perpendicular to flat side 106. The center of the reflecting surface 125 of the mirror is roughly in the center of chamber 28 and makes a 45° angle with the axis of the circular opening 32 denoted by line and arrow 126 in FIG. 2 and with line and arrow 50.

In use the threaded opening 32 is coupled to the output port of a laser or other highly directive energy emitting device. The output beam of energy, or laser beam in the preferred embodiment, travels along path 126 and is reflected off the mirror surface 125 and exits the chamber 28 generally along the line and arrow 50.

The control rod 70 can be moved in any direction radially from its center position by about 6 degrees and can be rotated about the center through 360° giving it universal movement. The movable socket 110 is free to rotate through a limited range directly about the axis through the indentations 90 in ball element 76 and indirectly through the rotation of the ball element 78 about the axis through the indentations 92. Since the axes are not parallel, this provides universal movement of the movable socket 110 and mirror surface 125, i.e., the socket 110 is free to rotate in any direction over a limited range defined by the spacing between the faces 106 and 116.

In response to movement of the control rod through 12 degrees of arc, the mirror surface 125 will move 12 degrees of arc. This is a ratio of 1:1. A 1:1 ratio is generally desirable since this provides a favorable sense of control to the operator. The reflected laser beam will exit the chamber 28 along one of a plurality of exit paths falling within a core whose axis is substantially aligned with line and arrow 50. The path is selected by movement of the mirror surface 125.

The beam deflector of the present invention provides ease of alignment of a laser beam through the aperture channel due to the ease of "finding" the beam which has been "pre-aligned" by the beam deflector. Further, the beam deflector is small, light, user friendly with good precision and smooth movement.

What is claimed is:

1. A beam deflector for deflecting a beam of emitted energy from a first path to one of a plurality of second paths which are disposed to impinge upon a target working area comprising:

a housing enclosing a chamber, said housing having a first port in a first side for receiving said beam into said chamber along said first path and a second port in a second side through which said beam exits said chamber along one of said second paths;

deflecting means within said chamber for intersecting said first beam and deflecting said first beam along anyone of said plurality of second paths;

control means coupled to said deflecting means for remotely moving said deflecting means from outside said chamber whereby any of said second paths can be selected, said deflecting means comprising:

a first ball element mounted in a first socket which socket is rotational throughout a preselected angular range about a first axis only through said first ball element;

a second ball element attached to said first ball element mounted in a second socket for rotational movement throughout a preselected angular range about a second axis only through said second ball element, said second socket attached to said housing; and a mirror element carried by said first socket and disposed to intersect said first path.

2. The beam deflector of claim 1 wherein said first and second axes are in parallel and spaced apart planes but said axes are not parallel.

3. The beam deflector of claim 2 wherein the projections of said first and second axes onto a single plane are not perpendicular.

4. The beam deflector of claim 3 wherein the opposite acute angles formed by said projections are approximately 15°.

5. The beam deflector of claim 1 wherein said control means comprises: a third ball element mounted for universal movement within a third socket coupled to a third side of said housing; an adjustment lever coupled to a first side of said third ball element and said deflecting means; and a control rod coupled to a second side of said third ball element opposite said first side.

6. The beam deflector of claim 5 wherein said adjustment lever is coupled to said first socket.

7. The beam deflector of claim 1 wherein opposing sides of said first and second sockets are spaced apart from one another by a predetermined distance wherein said preselected range of angular rotation is limited by engagement of said opposing sides, whereby ease of finding the beam is facilitated.

* * * * *